Figure 4:
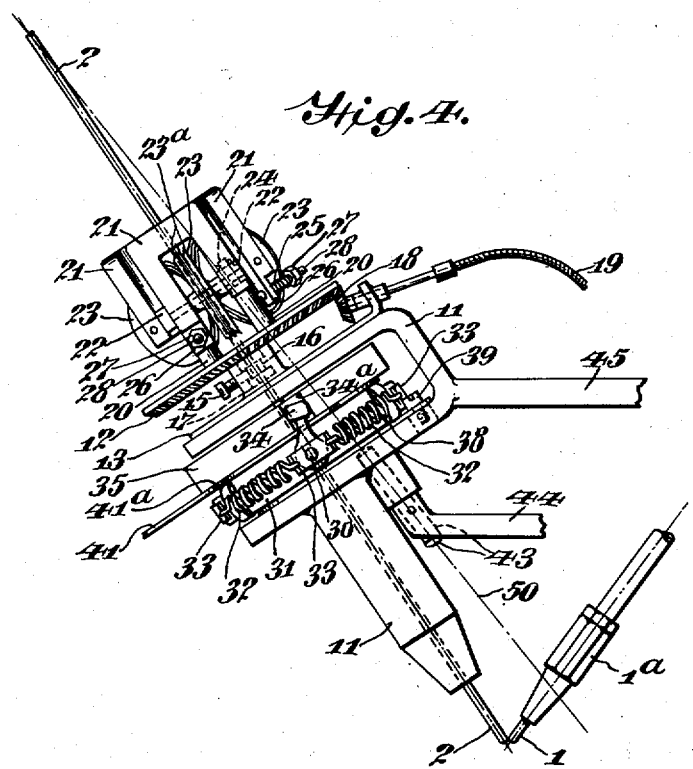

July 10, 1934.    S. A. ESKILSON    1,966,200
METHOD OF WELDING AND AUTOMATIC WELDING APPARATUS
Filed Sept. 15, 1931    4 Sheets-Sheet 1
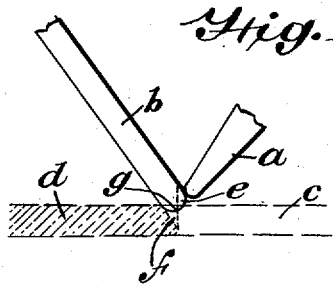
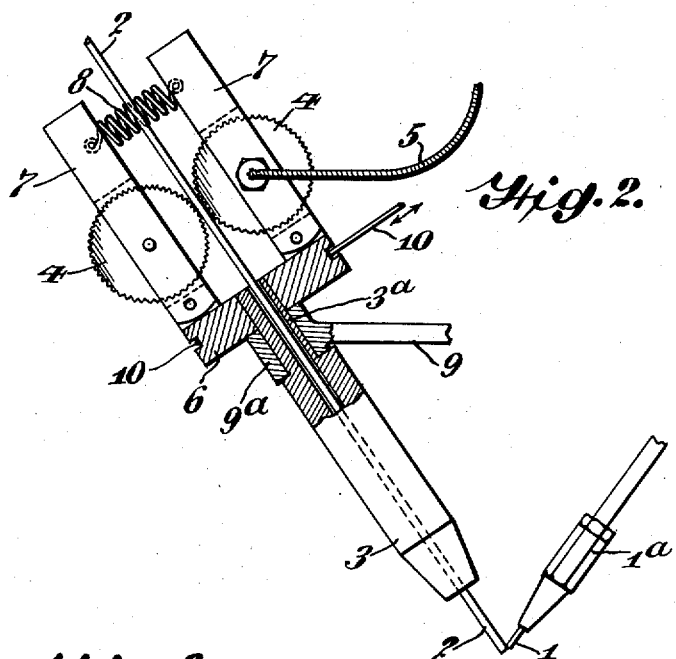
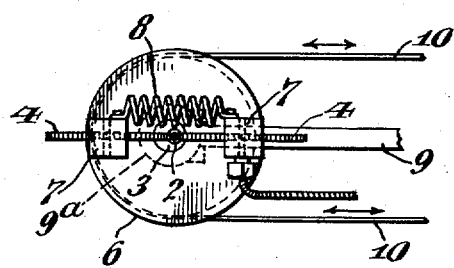
Inventor
Sven August Eskilson,
By John D. Myers
Attorney July 10, 1934.   S. A. ESKILSON   1,966,200
METHOD OF WELDING AND AUTOMATIC WELDING APPARATUS
Filed Sept. 15, 1931   4 Sheets-Sheet 2

Inventor
Sven August Eskilson,
By John D. Myers
Attorney

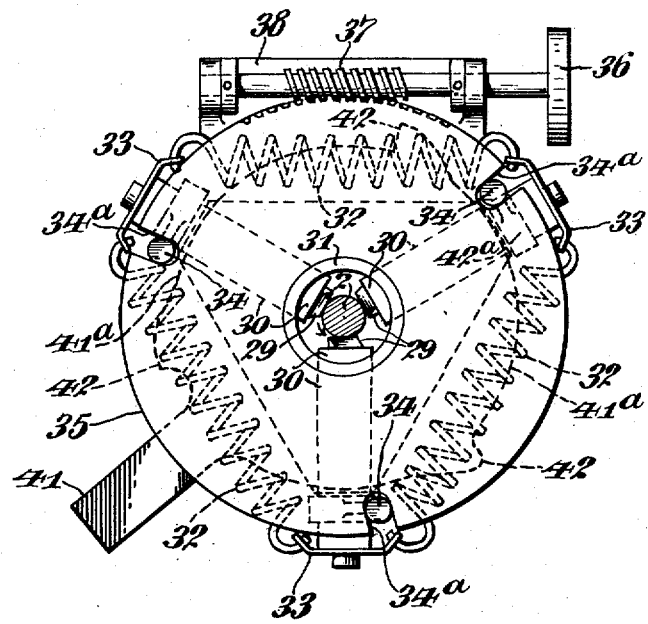

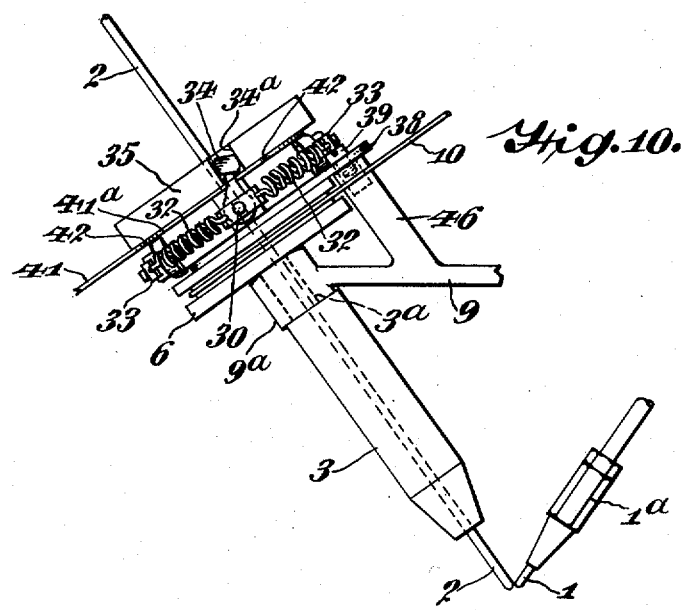
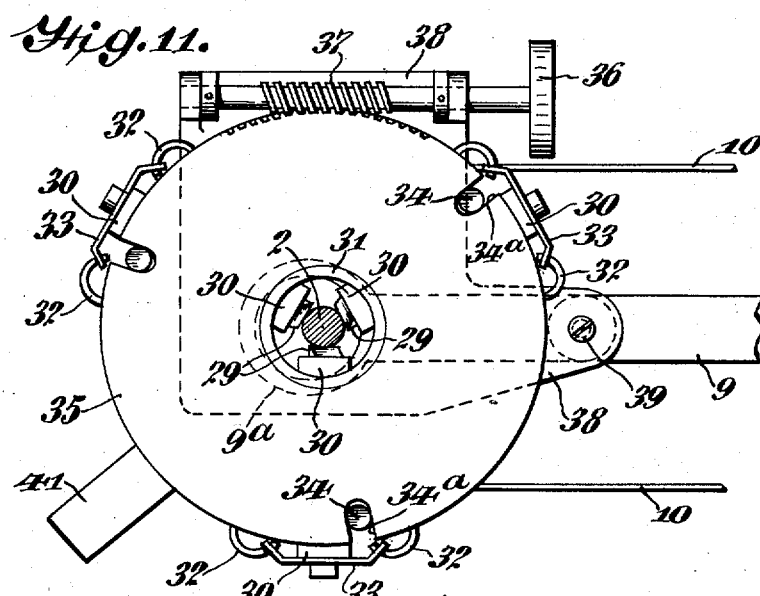

Patented July 10, 1934

1,966,200

UNITED STATES PATENT OFFICE 1,966,200

METHOD OF WELDING AND AUTOMATIC WELDING APPARATUS

Sven August Eskilson, Stockholm, Sweden, assignor to American Gasaccumulator Company, Elizabeth, N. J., a corporation of New Jersey Application September 15, 1931, Serial No. 562,881
In Sweden October 2, 1930

10 Claims. (Cl. 113—94)

This invention relates to a method of welding and to automatic welding apparatus of the kind in which a strip or rod of material is positioned adjacent the edges of the material to be welded, whereupon the edges of the material to be joined and the end of the strip are fused to effect a union of the edges of the material.

In manual welding operations a gas burner or an electrode as known is moved steadily in the longitudinal direction of the joint, and the additional material in the form of a wire, bar or the like is supplied to the bottom of the joint. Simultaneously herewith the additional material is constantly moved to and fro in the transversal direction of the joint. Said lateral oscillations serve to spread the additional material in the joint and also to facilitate the smelting of the additional material.

The application of this method of supplying the wire to welding machines has proved to cause certain inconveniences, which may be understood with reference to the schematic sketch Fig. 1 on the accompanying drawings. In said figure $a$ indicates the utmost part of the core of a welding gas flame, and $b$ the additional material in the form of a metal wire, $c$ indicates the welding joint in a vertical section, partly filled with metal $d$ in a molten or half-molten condition. The dotted lines in Fig. 1 at the end of the wire $b$ illustrate how the end of the wire $b$ is molten when it is supplied to the flame $a$ in the usual manner. The portion or surface of the wire $b$, facing the flame, is molten (at $e$), so that the end of the wire will be shaped as a point $f$, which dips down in the half-molten metal bath $d$ in the joint $c$ at and behind the smelting place, or adheres to the bottom or sides of the joint, whereby the establishing of the oscillations of the wire is made difficult.

The present invention has for its object to avoid this method of smelting, and consists in imparting to the wire a rotary or oscillatory motion during its supply to the joint, so that it will be uniformly molten round about without leaving a point such as $f$. The wire may be rotated to and fro half a revolution or a whole revolution or any sufficient part of revolution, or it may be continuously rotated in the same direction. The wire hereby will be molten equal rapidly round about, whereby its end will be shaped as illustrated by full lines in Fig. 1 (at $g$).

The drawings illustrate the employment of the invention for automatically welding machines. Although the machine described hereinafter is adapted for welding with gas, the invention also may be employed for an electric welding machine.

Figure 5:
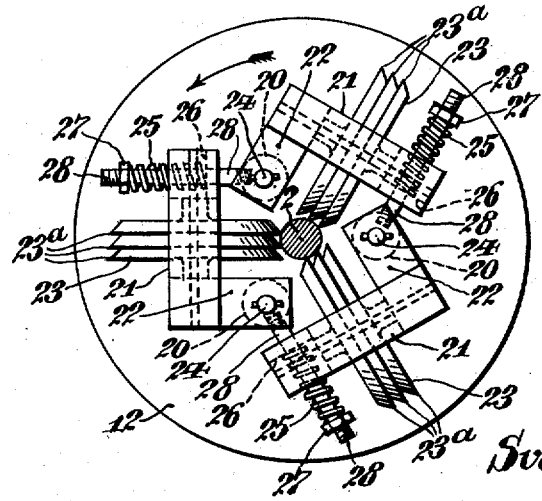
Figure 6:
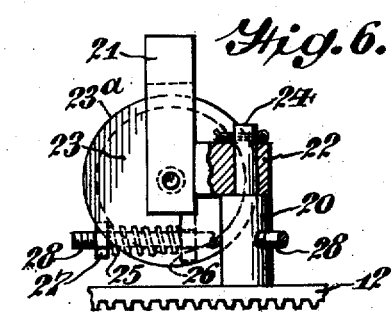

Fig. 2 illustrates an embodiment of the feeding or supply device for additional material in a welding machine, partly in a central longitudinal section. Fig. 3 is a plan of the feeding device as looked along the longitudinal axis of the device. Fig. 4 illustrates a modified embodiment of the invention in side elevation. Fig. 5 is a view, as looked in the direction of the longitudinal axis of the upper part of the device according to Fig. 4 on a larger scale. Fig. 6 illustrates a detail on a larger scale. Fig. 7 is a view as looked in the direction of the longitudinal axis of the lower part of the device in Fig. 4 on a larger scale. Figs. 8 and 9 illustrate a modified detail of Fig. 7 as looked from two sides at right angles to one another. Fig. 10 shows another modified arrangement of the feeding device in elevation. Fig. 11 shows this modified arrangement as looked in the direction of the longitudinal axis on a larger scale.

Figs. 2 and 3 illustrate a device in which the rotary motion of the additional material is performed along a certain part of a revolution.

The additional material (the wire) 2 is supplied or fed through a holder 3 towards the welding flame 1. Said feeding is performed in a known manner by means of disks or rollers 4, one of which is put in rotation in any convenient manner, say by means of a flexible shaft 5 connected to a movable member of the welding machine. Said movable member does not constitute part of the invention and is not shown on the drawings. The disks 4 are supported in bows 7 on a disk 6 for the rotation of the wire 2. One or more springs 8 force the disks towards the wire 2.

The holder 3 is supported excentrically in a bearing 9ª by means of a neck 3ª, said bearing being supported by an arm 9 extending from a fixed part of the welding machine. Said fixed part is not shown on the drawing. The above mentioned disk 6 is secured on the holder 3. Running in a groove in the disk 6 is a band or cord 10, which by alternately drawing its two parts, causes the disk 6 to rotate to and fro by friction, said band or cord being imparted a reciprocating motion as indicated by the arrows from a movable member of the machine. The arrangement for imparting such a motion to the band 10 is not illustrated on the drawings, as such arrangement is not essential for the invention. However it may consist of two excentrics. In this arrangement the additional material (the wire)

2 will be caused to rotate to and fro about its own axis, owing to the rotation of the disk 6 and the disks 4 about the additional material, and moreover the additional material will receive an excentric motion together with the holder 3 in relation to the centre of the bearing 9ª. If the holder 3 is applied properly in relation to the burner 1ª and the flame 1 the wire 2 will be uniformly molten round about with the aid of this arrangement, and moreover the desired lateral motion of the wire in relation to the joint is imparted to the wire.

A modified arrangement for supplying the additional material (the wire) 2 during its reciprocating rotation or oscillation and simultaneously establishing a varied velocity of the supply is illustrated in Figs. 4-9. Fig. 4 shows the arrangement as a whole, Fig. 5 shows the device for rotating the additional material, seen in the direction of the longitudinal axis and on a longer scale and Fig. 7 shows the device for supplying the additional material, seen in the direction of the longitudinal axis, and on a larger scale.

The wire (the additional material) 2 is fed through the holder 11 towards the welding flame 1, Fig. 4.

The rotation or oscillation of the wire is established as illustrated in Figs. 5 and 6. A toothed wheel 12 is journaled in a bearing 14 secured on a plate 13, and is guided by a screw 15, engaging a groove 16 in the hub 17 of the wheel 12, projecting into the bearing 14. The plate 13 is secured to the holder 11. The plate 13 carries a bearing for a toothed wheel 18 intermeshing into the wheel 12. To the shaft of the wheel 18 a flexible shaft 19 is secured, connected to a movable member (not shown) of the welding machine. On the toothed wheel 12 pillars 20, Fig. 6, carrying brackets 22, Figs. 5 and 6 projecting from bows 21, are secured. The bows 21, which carry disks 23, provided with one or more peripherical edges 23ª thus will be rotated about the pivots 24 of these pillars 20. But they are forced against the wire 2 by springs 25, abutting the washers 26 secured to the bows 21. The tension of the spring may be adjustable by the nut 27 on the screw 28, projecting from the pillar 20.

When the toothed wheel 12 is rotated by the toothed wheel 18 in the direction indicated by the arrow, Fig. 5, the bows 21 and the disks 23 will follow this rotation. The friction between the disks 23 and the wire thereby causes the wire to rotate.

For establishing the greatest friction between the disks 23 and the wire 2 the side of the edges 23ª, facing the direction of motion, ought to be placed at a right angle to the shaft of the disks 23.

The feeding down of the wire 2 is established when the wire rotates by means of edges 29 (Fig. 7) engaging the wire. The edges 29 are placed obliquely in relation to each other and each forms so to say a part of a thread, so as to form together a multi-threaded nut. The wire thus is screwed forward by said edges 29. By varying the oblique position of these edges (the pitch of the thread) the velocity of the supply is varied. The arrangement for establishing said variation is constructed as follows.

The edges 29, which may be one or more, are secured in pivots 30, and may be made in one piece with said pivots or may be inserted in holes in the same. The pivots 30 may be displaced axially and rotated in a central part 31. They are caused to be forced towards the wire 2 by springs 32, secured to washers 33 on the pivots 30 and are placed round about the central part 31. On the pivots 30 arms 34 are secured. Said arms project into grooves 34ª in a rotable disk 35, Figs. 4 and 7 supported in the central part 31 and rotable about the wire. If the disk 35 is rotated the pivots 30 will be rotated about their longitudinal axis under the action of their arms 34. The angle of inclination of the edges 29 then will be changed so that a corresponding change of the velocity of the feeding of the wire 2 will take place. Said rotation of the disk 35 is established by means of a hand wheel 36, connected to a screw 37, which engages the disk 35, which on a part of its periphery is shaped as a screwwheel. The screw 37 is journaled in a plate 38 on which the central part 31 is secured.

The plate 38, Fig. 4 is secured to the holder 11 by means of one or more bolts 39, Fig. 4, engaging holes in the holder 11, being relatively large (circular or oval). Hereby the plate 38 and the downwards feeding device will be admitted to be displaced in relation to the centre line of the holder 11, simultaneously as the plate will admit a rotary motion, whereby small bents on the wire may be neglected.

Instead of the edges 29 disks 40, Figs. 8 and 9 journaled in the pivots 30, may be used. The disks 40 may be provided with one or more edges 40ª going round about the disks 40. The disks 40 will establish a less friction than the edges 29 against the rotation of the wire 2.

That side of the edges 40ª of the disks 40, which in the same manner as described with reference to the disks 23, is facing the direction of the motion, ought to be at a right angle to the axis of the disks. Also the same side of the edges 29 ought to face the direction of supply of the wire.

By means of a disk 41ª, Figs. 4 and 7, provided with a handle 41 and rotatably journaled about the wire 2, the pivots 30 may be displaced outwards from the centre, thus enabling the wire 2 to be inserted. For this purpose the disk 41ª is provided with cams 42, actuating the arms 34.

The holder 11 is journaled on a bolt 43, Fig. 4, secured to an arm 44 projecting from a fixed part (not shown) of the welding machine. If said bolt 43 is placed in such a manner, that its axis intersects the axis of the wire 2 on a suitable height over the place of smelting between the flame 1 and the wire 2, as the dotted line 50 in Fig. 4 shows, the oscillations of the upper part of wire may be diminished. The lateral oscillations of the wire 2 are performed by means of an arm 45 on the holder 11, which arm is connected to a movable member (not shown) of the machine, such as an excentric, whereby the holder 11 is imparted an oscillating motion to and fro about the pivot 43.

Another embodiment of the invention is shown in Figs. 10 and 11. The device for rotating the wire is the same as that shown in Figs. 2 and 3 except that the band or cord 10 is not moved to and fro but is moved in one and the same direction in such a manner, that the holder 3 is made rotating. Thereby the wire 2 will describe a circle line behind the flame 1. If the friction in the lateral direction be sufficiently large between the wire 2 and the holder 3, all points at the end of the wire in succession will face the flame, and simultaneously the necessary lateral oscillations will be established, owing to the excentric journalling of the holder 3.

In the device above described disks and edges may be used for the supply of the wire. In this case the bolt (or bolts) 39 engages one (or more) relatively large hole in a bracket 46, secured to the arm 9. Owing to the size of the hole (or holes) the supply arrangement will follow the circular motion, described by the centre of the wire.

When using this arrangement only a member (the band or card 10) establishing the rotary motion as well as the lateral oscillations is needed. Said member may receive its motion from a rotatable disk on the welding machine or the like.

While certain forms of apparatus in which my invention may be embodied have been described herein, it is to be understood that various changes may be made therein and in the method referred to without departing from the spirit of my invention as claimed.

Having thus described my invention, what I claim and desire to secure by Letters Patent is:

1. In welding apparatus, the combination of a welding flame for applying heat to a joint to be welded, means for feeding a strip of material to the joint to be incorporated therein in molten condition, and means for rotating said strip about its axis as it is fed to the joint.

2. In welding apparatus, the combination of means for applying heat to a joint to be welded, means for feeding a strip of material to the joint to be incorporated therein in molten condition, means for rotating said strip, and means for producing relative transverse movement between said strip and the joint as the strip is fed to the joint.

3. In welding apparatus, the combination of means for applying heat to a joint to be welded, means for feeding a strip of material to the joint to be incorporated therein in molten condition, and means for imparting to said strip as it is fed to the joint rotational movement about its axis and transverse movement with respect to the joint.

4. In welding apparatus, the combination of a welding flame for applying heat to a joint to be welded, means for guiding to the welding flame a strip of material to be added to the joint in molten condition, means for imparting rotational movement to said material about its axis, and means for advancing said material toward said welding flame as said material is rotated.

5. In welding apparatus, the combination of means for applying heat to a joint to be welded, means for guiding to the heat applying means a strip of material to be added to the joint in molten condition, means for imparting rotational movement to said material about the axis of said strip, and adjustable means for advancing said material at varying speeds toward said heat applying means as said material is rotated.

6. In welding apparatus, the combination of a welding flame for applying heat to a joint to be welded, means for guiding to the welding flame a strip of material to be added to the joint in molten condition, means for imparting to said material rotational movement with respect to said heat applying means, and means for advancing said material toward said welding flame as said material is rotated.

7. In welding apparatus, the combination of means for applying heat to a joint to be welded, means for guiding to the heat applying means a strip of material to be added to the joint in molten condition, means for imparting rotational movement to said material about the axis of the strip, means for advancing said material toward said heat applying means as said material is rotated, and means for disengaging the material advancing means from the material.

8. In welding apparatus, the combination of means for guiding to a joint to be welded a strip of material to be added to the joint in molten condition, means for feeding the strip toward the joint, and means for imparting rotary movement to the guiding means about an axis eccentrically located with respect to the longitudinal axis of said strip to rotate said strip with respect to said joint and simultaneously move the strip transversely of said joint.

9. The method of welding which consists of feeding to a joint to be welded a strip of material to be added thereto in molten condition, applying heat to said strip and said joint by means of a welding flame, and simultaneously imparting to said strip a movement of rotation with respect to the source of heat.

10. The method of welding which consists of positioning adjacent a joint to be welded a strip of material to be added thereto in molten condition, applying heat to said strip and said joint, and simultaneously advancing said strip toward said joint, rotating said strip with respect to the source of heat, and causing said strip to move back and forth across said joint.

SVEN AUGUST ESKILSON.

CERTIFICATE OF CORRECTION.

Patent No. 1,966,200.  July 10, 1934.

SVEN AUGUST ESKILSON.

It is hereby certified that error appears in the printed specification of the above numbered patent requiring correction as follows: Page 3, line 7, for "card" read cord; page 3, line 87, claim 6, for "heat applying means" read welding flame; and line 116, claim 9, for "source of heat" read welding flame; and that the said Letters Patent should be read with these corrections therein that the same may conform to the record of the case in the Patent Office.

Signed and sealed this 7th day of August, A. D. 1934.

Leslie Frazer (Seal)

Acting Commissioner of Patents.

case the bolt (or bolts) 39 engages one (or more) relatively large hole in a bracket 46, secured to the arm 9. Owing to the size of the hole (or holes) the supply arrangement will follow the circular motion, described by the centre of the wire.

When using this arrangement only a member (the band or card 10) establishing the rotary motion as well as the lateral oscillations is needed. Said member may receive its motion from a rotatable disk on the welding machine or the like.

While certain forms of apparatus in which my invention may be embodied have been described herein, it is to be understood that various changes may be made therein and in the method referred to without departing from the spirit of my invention as claimed.

Having thus described my invention, what I claim and desire to secure by Letters Patent is:

1. In welding apparatus, the combination of a welding flame for applying heat to a joint to be welded, means for feeding a strip of material to the joint to be incorporated therein in molten condition, and means for rotating said strip about its axis as it is fed to the joint.

2. In welding apparatus, the combination of means for applying heat to a joint to be welded, means for feeding a strip of material to the joint to be incorporated therein in molten condition, means for rotating said strip, and means for producing relative transverse movement between said strip and the joint as the strip is fed to the joint.

3. In welding apparatus, the combination of means for applying heat to a joint to be welded, means for feeding a strip of material to the joint to be incorporated therein in molten condition, and means for imparting to said strip as it is fed to the joint rotational movement about its axis and transverse movement with respect to the joint.

4. In welding apparatus, the combination of a welding flame for applying heat to a joint to be welded, means for guiding to the welding flame a strip of material to be added to the joint in molten condition, means for imparting rotational movement to said material about its axis, and means for advancing said material toward said welding flame as said material is rotated.

5. In welding apparatus, the combination of means for applying heat to a joint to be welded, means for guiding to the heat applying means a strip of material to be added to the joint in molten condition, means for imparting rotational movement to said material about the axis of said strip, and adjustable means for advancing said material at varying speeds toward said heat applying means as said material is rotated.

6. In welding apparatus, the combination of a welding flame for applying heat to a joint to be welded, means for guiding to the welding flame a strip of material to be added to the joint in molten condition, means for imparting to said material rotational movement with respect to said heat applying means, and means for advancing said material toward said welding flame as said material is rotated.

7. In welding apparatus, the combination of means for applying heat to a joint to be welded, means for guiding to the heat applying means a strip of material to be added to the joint in molten condition, means for imparting rotational movement to said material about the axis of the strip, means for advancing said material toward said heat applying means as said material is rotated, and means for disengaging the material advancing means from the material.

8. In welding apparatus, the combination of means for guiding to a joint to be welded a strip of material to be added to the joint in molten condition, means for feeding the strip toward the joint, and means for imparting rotary movement to the guiding means about an axis eccentrically located with respect to the longitudinal axis of said strip to rotate said strip with respect to said joint and simultaneously move the strip transversely of said joint.

9. The method of welding which consists of feeding to a joint to be welded a strip of material to be added thereto in molten condition, applying heat to said strip and said joint by means of a welding flame, and simultaneously imparting to said strip a movement of rotation with respect to the source of heat.

10. The method of welding which consists of positioning adjacent a joint to be welded a strip of material to be added thereto in molten condition, applying heat to said strip and said joint, and simultaneously advancing said strip toward said joint, rotating said strip with respect to the source of heat, and causing said strip to move back and forth across said joint.

SVEN AUGUST ESKILSON.

CERTIFICATE OF CORRECTION.

Patent No. 1,966,200.

July 10, 1934.

SVEN AUGUST ESKILSON.

It is hereby certified that error appears in the printed specification of the above numbered patent requiring correction as follows: Page 3, line 7, for "card" read cord; page 3, line 87, claim 6, for "heat applying means" read welding flame; and line 116, claim 9, for "source of heat" read welding flame; and that the said Letters Patent should be read with these corrections therein that the same may conform to the record of the case in the Patent Office.

Signed and sealed this 7th day of August, A. D. 1934.

Leslie Frazer (Seal)

Acting Commissioner of Patents.